United States Patent [19]

Henningsson

[11] Patent Number: 4,632,863
[45] Date of Patent: Dec. 30, 1986

[54] GREEN-HOUSE CURTAIN

[75] Inventor: Göran Henningsson, Kinna, Sweden

[73] Assignee: Ludvig Svensson International B.V., Ljzuidland, Netherlands

[21] Appl. No.: 629,822

[22] PCT Filed: Nov. 9, 1983

[86] PCT No.: PCT/SE83/00389
§ 371 Date: Jul. 3, 1984
§ 102(e) Date: Jul. 3, 1984

[87] PCT Pub. No.: WO84/01969
PCT Pub. Date: May 24, 1984

[30] Foreign Application Priority Data

Nov. 10, 1982 [SE] Sweden .............................. 8206399

[51] Int. Cl.$^4$ .............................................. D03D 3/00
[52] U.S. Cl. ........................................ 428/225; 66/192;
66/202; 428/229; 428/253; 428/257; 428/263;
428/457
[58] Field of Search ............... 428/253, 257, 258, 259,
428/255, 131, 904.4, 225, 229, 263, 457; 66/192,
193, 202

[56] References Cited

U.S. PATENT DOCUMENTS

| 2,836,529 | 5/1958 | Morris | 428/257 |
| 3,567,565 | 3/1971 | Jones et al. | 66/202 |
| 4,183,993 | 1/1980 | Benstead et al. | 428/253 |
| 4,399,671 | 8/1983 | Henningsson | 66/202 |
| 4,425,398 | 1/1984 | Berczi | 428/253 |
| 4,434,200 | 2/1984 | Fash et al. | 428/257 |

Primary Examiner—James J. Bell
Attorney, Agent, or Firm—Holman & Stern

[57] ABSTRACT

A fabric for use as a green house curtain has spaced strips of flexible sheet material running in the longitudinal direction of the fabric, the strips being supported in a yarn framework of textile threads. The textile thread framework has transverse and longitudinal connection threads. The longitudinal threads are located between the strips on one side only of the fabric and the transverse threads are located on both sides of the fabric so as to extend respectively across opposite surfaces of the strips to trap the strips therebetween. The transverse threads on the side of the fabric opposite the longitudinal threads extend through the spaces between the strips for connection to the longitudinal threads.

8 Claims, 3 Drawing Figures

GREEN-HOUSE CURTAIN

CROSS REFERENCE TO RELATED APPLICATION(S)

This U.S. application stems from PCT International application No. PCT/SE 83/00389 filed Nov. 9, 1984.

TECHNICAL FIELD

The present invention refers to a green-house curtain or the like which comprises strips of a flexible material such as foil strips, which by means of textile threads engaging the strips are connected with each other.

BACKGROUND OF THE INVENTION

Curtains have been used as shading means in greenhouses successfully a number of years. The green-house curtain, even called the shading web, has replaced this previous common lime painting of the glass surfaces of the green-house, but has also involved other advantages. Thus it can be assured that the fall of cold which occurs when the ventilator doors are opened is eliminated and a continuous ventilation and heat distribution is obtained. Besides, the shading fabric stops the sun shine which is let in through the open ventilator doors. As a result of this the supplying of nutritive liquid to the plants cultivation can be kept more regular and at a lower level, at the same time as the difficult and risky job with the lime painting of the glass surfaces and the removal of the paint can be completely eliminated. It is also important that the green-house curtain is movable, i.e. that it is rollabel and drapable, so that in a simple way it can be pulled across or aside for regulating the inlet of light, at the same time as it when it is rolled up or draped does not require any considerable space.

The high costs for heating green-houses have enforced demands for a better heating insulation, and these wall linings with different type of foils alone or together with ceiling covering of a shading web, which are used up to now, gave almost unassuming heat savings. This mainly depends on the fact that the insulating efficiency of these materials are low.

Insulating is needed on different situations
(a) for strong radiation of sun (field of wave lengths 300–2.800),
(b) for low radiation during cold days to get a "positive balance of energy", i.e. the losses of heat are much higher than the profits of radiation during day time (windy, cloudy and cold days),
(c) the convection losses at night,
(d) heat losses by radiation at nights
(e) ventilating losses at night
(f) condensation losses at night
(g) combination of the above
To manage the above demands conventional textile material are not sufficient.

It is necessary to on one hand use materials which are transparent and/or reflecting for sun light and on the other hand materials which are highly reflecting or low emitting for long wave radiation. The combination of these qualities is not to find in textile materials, but in foils.

A foil is however not suitable for the purpose since it is diffusion proof, gathers water pockets, fractures, decays by sun light and is very stiff for being/draped, which is the established way to apply the fabric in a green-house. Condensing drops are besides formed on the inside, which can not be allowed.

The De-A-2836375 describes a crocheted fabric consisting of a net lik yarn structure, in the open net loops of which are laid strips of a flexible material, for example plastic foil strips. The purpose of this technique is to achieve a greater richness of variation as regards the pattern of the fabric. Thus it is possible to use foil paths with imprinted patterns which before the introduction into the crocheted goods are cut out to strips, so that the completed goods shows the same pattern as the foil path, but optically is open-worked by the textile threads. Such a crotcheted article suits for decoration purposes, such as for curtains in which the main purposes is to be decorative, but can not be used as greenhouse curtains, since the foil strips are arranged with relatively large spaces therebetween and therefore would allow convectional air streams, radiation and condensing water to pass through the fabric. Furthermore the connection between the foil strips and the textile connecting threads is not such that the relativly smooth strips are fixed against displacement.

Through the Swedish patent publication No. 8001544-9 it is known to design a green-house curtain as an insulating fabric, which between the double parallel textile paths strips of a heat radiation reflective material have been placed. This double insulating fabric has certainly a very good insulating effect and reflecting efficiency, but as it requires double textile paths, which through a special arrangement are connected with each other, the manufacturing price becomes relativly high at the same time as the double paths at the rolling, draping or bringing together sideways requires a relatively large space.

It is also known through the Swiss patent No. 138000 to use metal foil strips for textile purposes, said strips being used in order to bring about effects of applied industrial art, such as through using the strips in twisted form or through wrapping up them about a yarn.

THE PURPOSE OF THE INVENTION AND ITS MOST IMPORTANT CHARACTERICS

The purpose of the present invention is to provide a green-house curtain, which should fulfil the following demands:

(a) it should be drapable and rollable in both directions of the material path.

(b) it should be substantially tight against thermal air flows, but water-transmitting, so that no water gathering occurs if the green-house curtain is arranged horiszontally.

(c) it should be able to be manufactured in very large widths for example 6 meters without seams.

(d) it should release a certain amount of water vapour (e) it should be durable against mechanical damage as well as UV-decomposition.

(f) it should be able to be manufactured in several alternative designs, such as, high reflective low emitting, transparent, semitransparent, for certain radiation (through for example matalizing).

(g) it should be able to be made two-sided, i.e. having a textile property on one side, for example the under side, and a non-textile property on the other side, the upper side, so that the underside can bind the condensing water and the upper side can reflect solar radiation.

(h) the strips should be bound together and safely fixed in a stable yarn framework.

These demands have according to the invention been achieved by a green-house curtain of the kind mentioned in the introduction and where the strips at least partly consists of a low-emitting material and/or a material which reflects and/or absorbs heat radiation that the width of the strips corresponds to the space between the connecting threads in the longitudinal direction of the material paths—i.e. the mesh staples—so that the strips are located side by side closely to each other with only the mesh staples between them, forming an essentially unbroken connected surface, that the connecting threads substantially are located on one of the side of the fabric, preferably the underside, that the textile threads consists of a material which by influence of heat is shrinkable and through capillary effect is damp-keeping, and that the strips are thermomecanically fixed to the yarn framework formed by the textile threads.

DESCRIPTION OF THE DRAWINGS

The invention will be described in the following referring to the enclosed drawings showing some embodiments.

DESCRIPTION OF THE EMBODIMENTS

Figure 1:
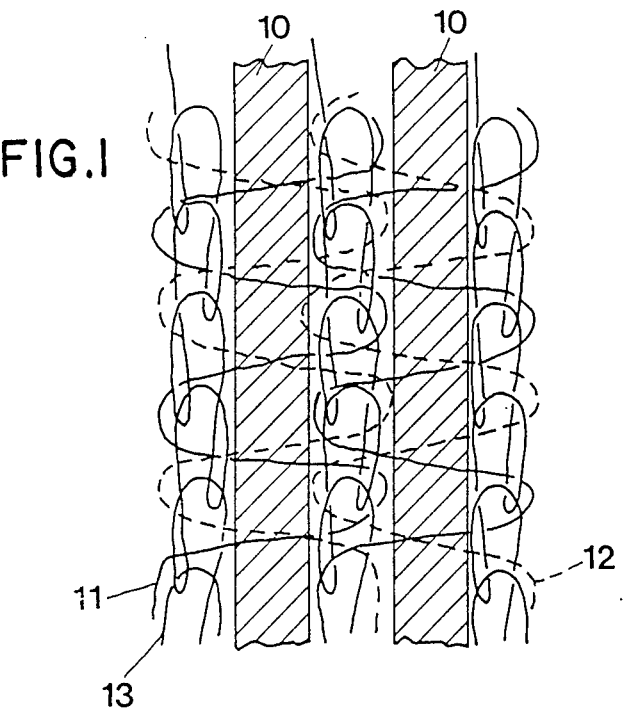
FIG. 1 shows on an enlarged scale the mesh pattern of a crocheted fabric according to the invention, in which for clarity the space between the strips are exaggerated strongly.
Figure 2:
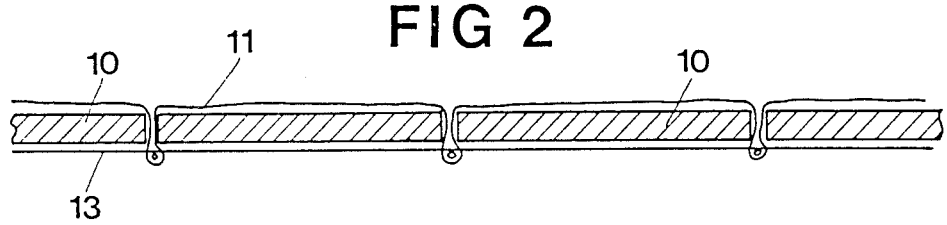
FIG. 2 shows on an enlarged scale and schematically a cross-section through a fabric according to the invention.
Figure 3:
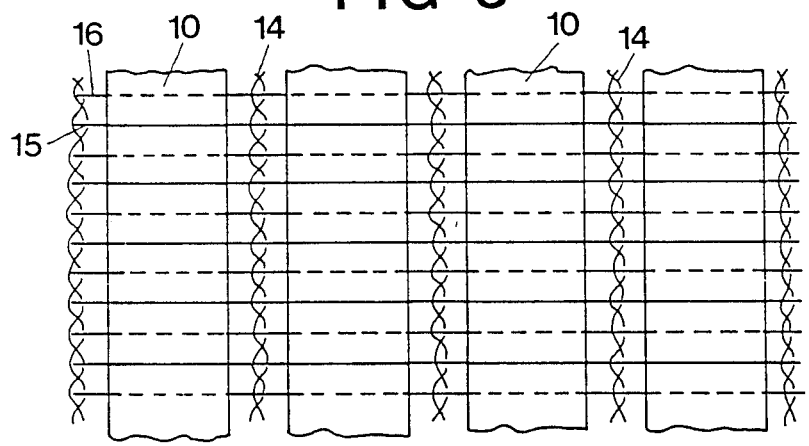
FIG. 3 shows on an enlarged scale a fabric according to the invention manufactured through a weaving procedure.

The fabric according to the invention consists of a number of narrow foil strips 10, which are connected by textile threads. The foil strips are arranged closely edge to edge, so that they form an essensially connected surface. In the embodiment shown in FIGS. 1 and 2 the foil strips 10 are connected to each other through a knitting procedure. FIG. 1 shows the mesh pattern for a fabric manufactured through warp knitting at which four guide bars are used, one for the foil strips 10, two for the transverse these extending connection threads 11, 12 and the fourth for the longitudinal connection threads 13.

The space between the foil strips 10 have been exaggerated strongly in order to make the mesh pattern clear. In reality the above mentioned foil strips 10 are located closely edge to edge. The longitudinal connection threads 13 are arranged on the one side of the fabric, the under side, while the transvers threads are located on both sides of the fabric, the upper and the under side. The connection between the longitudinal and the transverse threads are made on the under side of the fabric, as it appears from FIG. 2. The foil strips can by that be put closely edge to edge and the unbroken connected surface on the upper side of the fabric becomes as large as possible.

FIG. 33 shows a woven fabric, where the foil strips 10 makes the wrap reinforced with an extra textile warp thread 14 under the strips. The weft is made by textile threads 15, 16, which preferably extend in loop connection. Also here has for the sake of clarify the space between the foil strips 10 been strongly exaggerated. the weft threads 15 extending on the upper side of the fabric can be thinner than those on the under side and made of a transparent material.

The foil strips 10 can be of different materials in order to give them desirable properties. By using a sunlight transparent foil, which is not transparent for heat radiation, it is possible to obtain a light shading against sunlight. Besides it is achieved an extra insulating during cold, cloudy, windy days without missing more light for this reason. A heat insulating at night is obtained too.

With a partly sunlight transparent foil, which can be metalized and for this reason reflecting resp. low emitting against heat radiation is obtained a great shading effect compared with the above.

Such a fabric can be suitable in hot contries to keep the heat outside the house effectively, or in other connections, where a very good heat insulation is desired.

A foil which is low emitting for all radiation can be used for heat insulation at night and for darkening at day.

One side of the foil strips (the under side) can be provided with a black layer absorbing heat radiation, while the upper side is metalized and aboveall with high reflecting.

To keep the fabric free from condensing drops on the underside this must on the first hand be kept warm. This is possible by making the upper side low-emittering and the underside absorbing. By arranging the threads closely on the underside and with extra thickness, this side can be compared with a textile material and can bind relatively large amounts of water capillary. By that condensing drops and a wet upperside are avoided, which if it becomes wet no longer is low emitting.

The advantages with such a fabric consisting of narrow strips compared to a continuous foil are many: it is more pliable and can be draped and rolled up, it is not water, or diffusion tight and can be therefore not collect water vapour, it can be made very durable and it can be given a textile property on one side.

After that the fabric is manufactured it is preferably exterted to thermo fixation, of which it under tension is passed through a heat zone of about 150 C.

The invention is of course not limited to the embodiments shown but can be modified with in the scope of the claims.

I claim:

1. A green-house curtain comprising spaced strips of a flexible sheet material running in one direction, a longitudinal direction, of the curtain and which are interconnected by means of textile threads in a yarn framework, the strips being selected from a group consisting of heat radiation reflecting and heat radiation absorbing material, wherein the yarn framework includes transverse connection threads connected to spaced longitudinal connection threads, the longtudinal connection threads being located only on one side of a plane containing the strips, respective transverse connection threads being located on opposite sides of said plane so as to extend respectively across opposite surfaces of the strips, and the transverse threads on the other side of said plane extending through the spaces between adjacent strips for connection to the longitudinal threads wherein one surface of each strip is metalized and low-emissive, and the other surface is heat absorbing.

2. A green-house curtain according to claim 1 wherein the strips consist of material which at least partly transmits light.

3. A green-house curtain according to claim 1 wherein the connection threads on one side of the fabric are closer together than on the other side.

4. A green-house curtain according to claim 1 in the form of a warp-knitted fabric in which the strips form the warp.

5. A green-house curtain according to claim 1 in the form of a woven fabric in which the strips form the warp and the transverse connection threads form the weft and in which reinforcing warp threads forming the longitudinal connection threads are located on one side of the fabric.

6. A fabric which comprises a plurality of flexible foil-like strips extending in one direction, a longitudinal direction only, of the fabric, and which are connected together by textile threads formed into a yarn framework, the strips being selected from materials providing required heat and light reflection, transmission, and absorbtion properties for a green-house curtain, the yarn framework comprising seperate transverse and longitudinal connection threads, the longitudinal connection threads being located only on one side of a plane containing the strips, and being located adjacent intervals between the respective strips, the transverse connection threads being located on both sides of said plane across opposite faces of the strips and being connected with the longitudinal threads so as to fix the strips in position, the width of the strips corresponding to the spacing between the longitudinal connection threads with only the transverse connection threads extending through the intervals between the strips, and the connection threads being of a material which is capable of absorbing water by capiliary action.

7. A fabric according to claim 6 wherein the transverse connection threads on one side of the fabric are thinner than the threads on the other side.

8. A fabric according to claim 7 wherein the thinner threads are made of a transparent material.

* * * * *